US006488004B1

United States Patent
Adamovski

(12) United States Patent
(10) Patent No.: US 6,488,004 B1
(45) Date of Patent: Dec. 3, 2002

(54) TOROIDAL INTERNAL COMBUSTION ENGINE AND METHOD FOR ITS THERMO-STABILIZATION

(75) Inventor: Victor Isaevich Adamovski, Petach Tikva (IL)

(73) Assignee: Medis EL Ltd., Yehud (IL)

( * ) Notice: Subject to any disclaimer, the term of this patent is extended or adjusted under 35 U.S.C. 154(b) by 20 days.

(21) Appl. No.: 09/685,005

(22) Filed: Oct. 6, 2000

Related U.S. Application Data

(60) Continuation-in-part of application No. 09/250,239, filed on Feb. 16, 1999, now Pat. No. 6,132,197, which is a continuation-in-part of application No. 09/146,362, filed on Sep. 3, 1998, now Pat. No. 6,250,277, which is a continuation-in-part of application No. 09/069,545, filed on Apr. 30, 1998, now abandoned, which is a continuation-in-part of application No. 08/946,986, filed on Oct. 8, 1997, now abandoned, which is a division of application No. 08/743,434, filed on Nov. 1, 1996, now Pat. No. 5,797,366.

(51) Int. Cl.[7] .......................... F02B 53/00; F01C 21/06; F04C 29/04
(52) U.S. Cl. .......................... 123/232; 123/238; 418/83; 418/91; 418/179
(58) Field of Search ................ 123/236, 237, 123/238, 232; 418/91, 179, 178, 83

(56) References Cited

U.S. PATENT DOCUMENTS

| 1,688,816 A | * | 10/1928 | Kraus .......................... 123/238 |
| 2,062,753 A | * | 12/1936 | Linn ........................... 123/238 |
| 3,964,445 A | | 6/1976 | Ernest et al. |
| 4,928,658 A | | 5/1990 | Ferrenberg et al. |
| 5,002,481 A | | 3/1991 | Forster |
| 5,156,114 A | | 10/1992 | Gunnerman |
| 5,239,959 A | | 8/1993 | Loth et al. |
| 5,305,721 A | * | 4/1994 | Burtis .......................... 123/205 |
| RE35,257 E | | 5/1996 | Reusch et al. |
| 5,571,244 A | * | 11/1996 | Andres ......................... 418/152 |

FOREIGN PATENT DOCUMENTS

| DE | 581688 | * | 7/1933 | |
| DE | 1149941 | * | 6/1963 | |
| JP | 4-136428 | * | 5/1992 | ............... 418/178 |

* cited by examiner

Primary Examiner—Michael Koczo
(74) Attorney, Agent, or Firm—Mark M. Friedman

(57) ABSTRACT

A thermal design and method of operation of a rotary internal combustion engine having at least one housing, a rotor rotating within the housing, and a mechanism for combusting mixture of fuel air and steam supplied into the housing to drive the rotor, in which the temperature of the inner walls of the combustion region which are in contact with combusting gases attains 700° C., and in which the temperature of the combusting gases does not exceeds 1800° C. The thermal design includes: lining of the surface of the combustion zone with heat resistive materials such as a refractory metal; the use of material with low heat conductivity such as iron for the construction of the body of the engine in order to minimize heat loses by heat transfer to ambient; and the effective cooling of the body of the engine with boiling heat transfer by water which is circulated in cooling channels passing throughout the engines structure. Methods of operation of the engine include the feedback of steam, which is produced in the cooling channels into the combustion region where it is mixed with the fuel and thus lowers the temperature of the combusting gases while leaving the power of the engine intact, and the use of the hot gases of burnt fuel to ignite a fresh compressed mixture of fuel air and steam.

19 Claims, 15 Drawing Sheets

TOROIDAL INTERNAL COMBUSTION ENGINE AND METHOD FOR ITS THERMO-STABILIZATION

This is a continuation-in-part of U.S. patent application Ser. No. 09/250,239 filed Feb. 16, 1999, now U.S. Pat. No. 6,132,197, which is a continuation-in-part of U.S. patent application Ser. No. 09/146,362 filed Sep. 3, 1998, now U.S. Pat. No. 6,250,277 which is a continuation-in-part of U.S. patent application Ser. No. 09/069,545, filed Apr. 30, 1998, now abandoned, which is a continuation-in-part of U.S. patent application Ser. No. 08/946,986, filed Oct. 8, 1997, now abandoned, which is a divisional application of U.S. patent application Ser. No. 08/743,434, Now U.S. Pat. No. 5,797,366.

FIELD AND BACKGROUND OF THE INVENTION

The present invention relates to internal combustion engines and, more particularly, to an internal combustion engine that is significantly more efficient than those known heretofore.

Internal combustion piston engines have been familiar and ubiquitous since the days of Otto and Diesel. These engines suffer from several widely recognized deficiencies. One is that their thermal efficiencies are far less than their theoretical efficiencies according to the second law of thermodynamics. Up to 30% of the heat released by fuel combustion is absorbed by the engine cooling systems. Another 30% is devoted to engine operation, including compressing air or an air-fuel mixture in the cylinders of these engines. From 5% to 20% of the available energy may be wasted because of incomplete combustion of hydrocarbon fuels. The net result is that these engines generally have overall efficiencies between 32% and 42%.

Another deficiency of these engines is that their exhausts tend to contain toxic substances: carbon particles and carcinogenic hydrocarbons because of incomplete combustion, and nitrogen oxides formed at the high (1800° C. to 2000° C.) combustion temperatures that characterize these engines. A third is that they provide power by transforming the reciprocating motion of their pistons to the rotary motion of their crankshafts. When the fuel-air mixture in a cylinder of an internal combustion engine explodes, the piston is at or near top dead center. At this position, the moment arm, across which the rod connecting the piston to the crankshaft transfers force to the crankshaft, is close to zero. Therefore, the piston exerts minimal torque on the crankshaft. As the piston moves down from top dead center, the moment arm through which the piston transfers force increases, but in the meantime the combustion gases expand somewhat, losing some of their propulsive force, so that the maximum torque exerted on the crankshaft is less than the maximum torque that could be exerted if the force of the piston could always be transferred to the crankshaft at maximum moment arm. Several attempts have been made to address some of these deficiencies.

Ferrenberg et al. (U.S. Pat. No. 4,928,658) use a heat exchanger to preheat the input fuel and air of an internal combustion engine with some of the heat of the exhaust gases. Loth et al. (U.S. Pat. No. 5,239,959) ignite the fuel-air mixture in a separate combustion chamber before introducing the burning mixture to the cylinder, in order to attain more complete combustion and inhibit the formation of nitrogen oxides.

Forster (U.S. Pat. No. 5,002,481) burns a mixture of fuel, air and steam. This mixture burns at a relatively low temperature of about 1400° C., and nitrogen oxides are not formed. Gunnerman (U.S. Pat. No. 5,156,114 and in RE35, 257) burns a mixture of hydrocarbon fuel and water, but requires a hydrogen-forming catalyst to achieve the same power with his mixture as with ordinary gasoline. Each of these prior art patents addresses only one of the defects of reciprocating internal combustion engines. None addresses the problem in its totality. U.S. Pat. No. 5,797,366, which is incorporated by reference for all purposes as if fully set forth herein, and co-pending U.S. patent application Ser. No. 09/069,545, describe an engine that further addresses the outstanding deficiencies of existing internal combustion engines. Firstly, in this engine, the axis of rotation of the power shaft of the engine is perpendicular to the plane of motion of the piston. The piston is connected to the power shaft of the engine, and the force of the piston always is applied to the power shaft at a constant moment arm perpendicular to that axis of rotation, so that maximum torque is imposed on the power shaft.

Secondly, in this engine, high pressure steam is extracted from the cooling system and returned to the combustion chambers, thus preventing severe heat loses and increasing thermal efficiency. Thirdly, ecologically it is a desirable engine in which a mixture of fuel, air and steam is burned in one or more combustion chambers, each combustion chamber being defined by a toroidal combustion chamber housing, a piston and a valve. The mixture is burned at a temperature of about 1800° C. which is by about 200° C. lower than the combustion temperature in existing internal combustion engines, thereby minimizing the formation of nitrogen oxides and reducing the warming up of the globe.

Yet, the toroidal engine of U.S. Pat. No. 5,797,366 and co-pending U.S. patent application Ser. No. 09/069,545 has a principle drawback; the volume of the combustion chamber increases as the burning mixture pushes the piston away from the valve. This increase in volume, before the mixture is entirely burned, tends to decrease the thermodynamic efficiency of this engine. The engine described in PCT Application US99/19315, which is incorporated by reference for all purposes as if fully set forth herein, and in U.S. application Ser. Nos. 09/146,362 and 09/250,239 is free from this drawback because the combustion stage there, takes place at a constant volume.

Thus, the thermodynamic efficiency of the combustion stage of the engine described in PCT application US99/19315 and in U.S. application Ser. Nos. 09/146,362 and 09/250,239 is superior to the efficiency of the corresponding engine which is described in U.S. Pat. No. 5,797,366 and co-pending U.S. patent application Ser. No 09/069,545, and therefore it represents a very efficient engine from the mechanical, and thermodynamical standpoints.

In order to construct and to operate this engine, its basic mechanical design has to be accompanied by a thermal design which will address the main point of its cooling and the prevention of heat loses during its operation.

Yet, even this engine has some thermal inefficiency which is related to its heat loses. It is known that rotary internal combustion engines have unique dynamic thermal control problems which are partly described in U.S. Pat. No. 3,964,445 to Ernest, et al. Summing up briefly: The inner surface of the rotor housing is subjected to higher temperatures and to much greater temperature extremes as compared to the inner surfaces of the cylinders of the reciprocating engines.

The uneven temperature distribution along the inside of the toroidal chamber and the need to dissipate large quantities of heat, dictate the use of a good heat conductor, consisting of aluminum alloy, as the housing material, even so, the Wankel engines which have a housing made of aluminum, and which are the only type of rotary engine which have achieved commercial success, can be cooled efficiently only because the large surface-to-volume ratio of their combustion and expansion chambers.

It appears that regulating and stabilizing the temperature of a rotary engine during operation and minimizing heat loses to surrounding are apparently two contradicting objects which their simultaneous fulfillment is yet an unsolved problem.

As a result most rotary internal combustion engines did not live to their expectations, and it is impossible to utilize their basic advantages.

SUMMARY OF THE INVENTION

I have discovered that: in the engine of PCT Application US99/19315, raising the temperature of the inner surface of the toroidal chamber in general, and of tile inner surface of the combustion chamber in particular, to 650° C.–700° C., optimizes the thermal efficiency of the engine, provided that the engine can be cooled effectively, without wasting the heat absorbed by the coolant. This leads to an improvement of the engine.

The present invention is the thermal design of a toroidal internal combustion engine, aimed to enable this temperature range of the inner walls of the combustion chamber, which includes the selection of the appropriate materials for its construction, and method of its stable operation.

According to the present invention there is provided an engine including: (a) at least one housing; (b) a rotor, rotating within the at least one housing, and (c), a mechanism for supplying fuel and air to the at least one housing, combustion of said fuel in said air then driving said rotation of the rotor; wherein, in at least one of said at least one housing, at least one component, selected from the group consisting of the rotor, and the at least one housing, is made of a material having a thermal conductivity no greater then that of iron.

According to the present invention there is provided an engine including, (a) at least one housing; (b) a rotor, rotating within said at least one housing, and (c) a mechanism for supplying fuel and air to the at least one housing, combustion of the fuel in the air then driving the rotation of the rotor; wherein the surface of at least one component selected from the group consisting of the rotor and, a portion of said housing that is in contact with combusting gases, is lined with a layer of heat resistive material.

According to the present invention there is provided an engine including, (a) at least one housing; (b) a rotor, rotating within the at least one housing, (c) a mechanism for supplying fuel and air to the at least one housing, combustion of said fuel the air then driving the rotation of the rotor, and (d) at least one cooling flow channel to carry aqueous cooling medium in the at least one component selected from the group consisting of the at least one housing, and the rotor, further comprising; a mechanism for leveling and regulating heat fluxes into the aqueous cooling medium, to ensure that the heat fluxes will be no greater then about 120 W/cm$^2$.

According to the present invention there is provided a method for operating an engine having a combustion zone and a cooling flow channel wherein, an aqueous cooling medium is at least partially converted into steam while cooling hot gases in the combustion chamber of the engine, comprising the steps of: (a) burning a fuel-air-stream mixture in the combustion zone; (b) withdrawing at least some of the steam from the flowing cooling channel; and, (c) introducing a fuel-air mixture together with the withdrawn steam to the combustion zone.

According to the present invention there is provided a method for using gases of combusted fuel for generating mechanical power in an engine, comprising the steps of: (a) providing an engine having two housings, for each said housing, a rotor rotating within said housing, a mechanism for supplying fuel and air to at least one of said housings, combustion of said fuel in said air then driving rotation of said rotor; and, (b) delivering gases of said combusted fuel from said housing in which said combustion takes place to said other housing.

According to the present invention there is provided an engine, comprising: (a) two housings; (b) for each of the two housings: a rotor, rotatably mounted within each housing, the rotor and each housing defining between them a toroidal chamber, the rotor including at least one piston projecting into the toroidal chamber, each of the at least one piston including a leading face and a trailing face; and, (c) for each the housing, at least one valve, movably mounted within each housing; wherein a combustion region of substantially constant volume is bounded by the leading face of the at least one piston of a first of the two housings while the at least one piston approaches the at least one valve of the first housing, and by the trailing face of the at least one piston of a second of the housing while the at least one piston departs the at least one valve of the second housing.

The present invention follows the mechanical design of the engine described in PCT application US99/19315. Like the prior art engine of U.S. Pat. No. 5,797,366 and co-pending U.S. patent application Ser. No. 09/069,545, the engine of the present invention includes one or more housings with toroidal interiors. Within each housing rotates a rotor to which is attached one or more pistons that projects into the toroidal interior of the housing. The rotor and the housing define between them a toroidal chamber. One or more valves in the housing alternately seals the region between itself and an approaching or departing piston or moves to allow the piston to pass.

Like the prior art engine of U.S. Pat. No. 5,797,366 and co-pending U.S. patent application Ser. No. 09/069,545, the engine of the present invention includes provisions for engine cooling by water, superheated water steam that is produced in cooling flow channels which run throughout the engine body, and is partially injected as steam into the combustion chamber to increases the thermal efficiency of the engine and to lower the combustion temperature.

One difference between the engine of the present invention and the engine of U.S. Pat. No. 5,797,366 and co-pending U.S. patent application Ser. No. 09/069,545, is that in the preferred embodiment of the engine of U.S. Pat. No. 5,797,366 and co-pending U.S. patent application Ser. No. 09/069,545, separate toroidal chambers are used for compression, combustion and expansion, and combustion occurs there in a steadily increasing volume; whereas in the engine of the present invention, the valves, the pistons, the rotor, or some combination thereof, define a combustion region of approximately constant volume in which combustion takes place as the valve or valves move to accommodate the transit of the one or more pistons.

This allows the engine of the present invention to operate according to the more efficient Trinkler cycle: A mixture of compressed air, steam and fuel introduced into the combustion region by the cooperative motion of the pistons and the valves burns therein at approximately constant volume. The burning mixture then is released to an expansion region, where more fuel is injected to continue the burning and keep the expanding mixture at least initially at approximately constant pressure. The difference between the present invention and the invention in PCT application US99/19315, is that former applications dealt exclusively with the mechanical description of the engine, while the present invention discloses its thermal design and the materials which have to be used in order to enable its construction and subsequent steady state operation in optimal thermal conditions.

The heart of the invention is the design, construction and method of operation of an engine in which the temperature of the inner walls of the combustion and expansion chamber during steady state operation will stay uniformly distributed, constant with time at a value of 650° C. to 700° C. We refer to this situation as thermo-stabilization of the engine.

Thermo-stabilization is achieved by balancing apparently two contradicting effects; (a) increasing the temperature of the inner surface of the combustion and the expansion chambers, and (b); an effective heat removal from the body of the engine.

The increase of the temperature of the inner walls, which are in contact with the burning gases produced during the combustion, is aimed to diminish the rate of cooling of these gases by the walls and thus, contributes to efficiency by lowering pressure decrease inside the expansion chamber during the stroke.

The way by which this increase in the temperature of the interior walls of the chambers is achieved, is by the use of constructing materials with average lower heat conductivity than the heat conductivity of the constructing material of existing internal combustion engines, e.g. the use of iron alloys such as cast iron or steel instead of aluminum alloys.

Consequently, the engine loses less heat to surrounding, and has to be alternatively forced cooled by circulating water in cooling flow channels which are bored in the housing, in the rotor and in the valve. This forced cooling system has to be more efficient then the existing cooling system for internal combustion engines.

Here, an effective cooling method is provided, which is based on the physical effect known as "boiling heat transfer" in which a liquid dissipates heat from its cooled object by absorbing heat because of its partial evaporation.

The liquid which is conducted in cooling flow channels bored in the body of the member to be cooled, may be driven by a pump or moves in its channels by other means, e.g. centrifugal forces. If the liquid is water moving in its channel at a speed of about 0.5–0.8 m/sec, its coefficient of boiling heat transfer is between 5 W/(cm$^2$ degree C.) and 10 W/(cm$^2$ degree C.), as taught in U.S. Pat. No. 5,977,714 to Adamovski.

The cooling by the mechanism of "boiling heat transfer" requires uniform and controlled heat fluxes along the circumference of the cooling flow channel which is in contact with the water. It is necessary to limit the dissipated heat flux to about 120 W/cm$^2$, otherwise the water in the hotter part of the channel will boil vigorously in the mechanism of "film boiling" and lose contact with the inside wall of the channel. To achieve this uniformity and control, the heat conductivity of the block of material in which the cooling channels run, is locally modified by insertions, which have heat conductivities different than that of the block material.

The water, which boils in the cooling flow channel, becomes a high-pressure hot steam (100 Kg/cm$^2$ at 300° C.), This steam is introduced into the compression chamber of the rotary engine together with fuel injection. Thus, the heat collected during cooling is not dissipated; instead, it produces some extra work because the injected steam expands as it is heated during the combustion.

The combustion mixture which includes air, hot steam and fuel vapor, does not degrade the power of the engine in comparison to the power produced by the steam less mixture, and it has the advantage, that the combustion temperature is lowered and hence, less poisonous nitrogen oxide is formed.

Accordingly, the scope of the invention also includes a protocol for injecting fuel, air, steam and even burned gases into the combustion chamber. The fuel is a fluid (liquid or gas) hydrocarbon or mixture of hydrocarbons, such as gasoline, diesel fuel, kerosene, an alcohol such as ethanol or methanol, propane, butane, and natural gas. If the flash point of the injected fuel is sufficiently low, it ignites spontaneously. Otherwise, the fuel is ignited by conventional ignition means such as a spark plug.

The disclosures in the present invention are applicable to internal combustion engines in general, and to rotary internal combustion engines in particular, thus it is the object of the present invention to provide an internal combustion engine with improved thermal efficiency.

It is another object of the present invention to provide an internal combustion engines with low heat loses.

It is another object of the present invention to provide an internal combustion engine, which is more economical on fuel than prior art engines.

It is another object of the present invention to provide an internal combustion engine, which is more reliable than prior art engines.

It is another object of the present invention to provide an internal combustion engine that has minimum impact on the environment.

It is another object of the present invention to provide an internal combustion engine, which contributes less nitrogen-oxide pollutants during its operation than prior art engines.

It is another object of the present invention to provide an internal combustion engine, which contributes less heat to the environment than prior art engines.

Other objects of the invention will become apparent upon reading the following description taken in conjunction with the accompanying drawings.

BRIEF DESCRIPTION OF THE DRAWINGS

The invention herein described, by the way of examples only with reference to the accompanying drawings, wherein.

DETAILED DESCRIPTION OF THE INVENTION

The present embodiments herein are not intended to be exhaustive and to limit in any way the scope of the invention, rather they are used as examples for the clarification of the invention and for enabling of other skilled in the art to utilize its teaching.

The present invention is of a toroidal internal combustion engine in which the rotors, the pistons, and valves define one or more combustion regions of approximately constant volume, thereby allowing the implementation of a Trinkler cycle.

Figure 1:
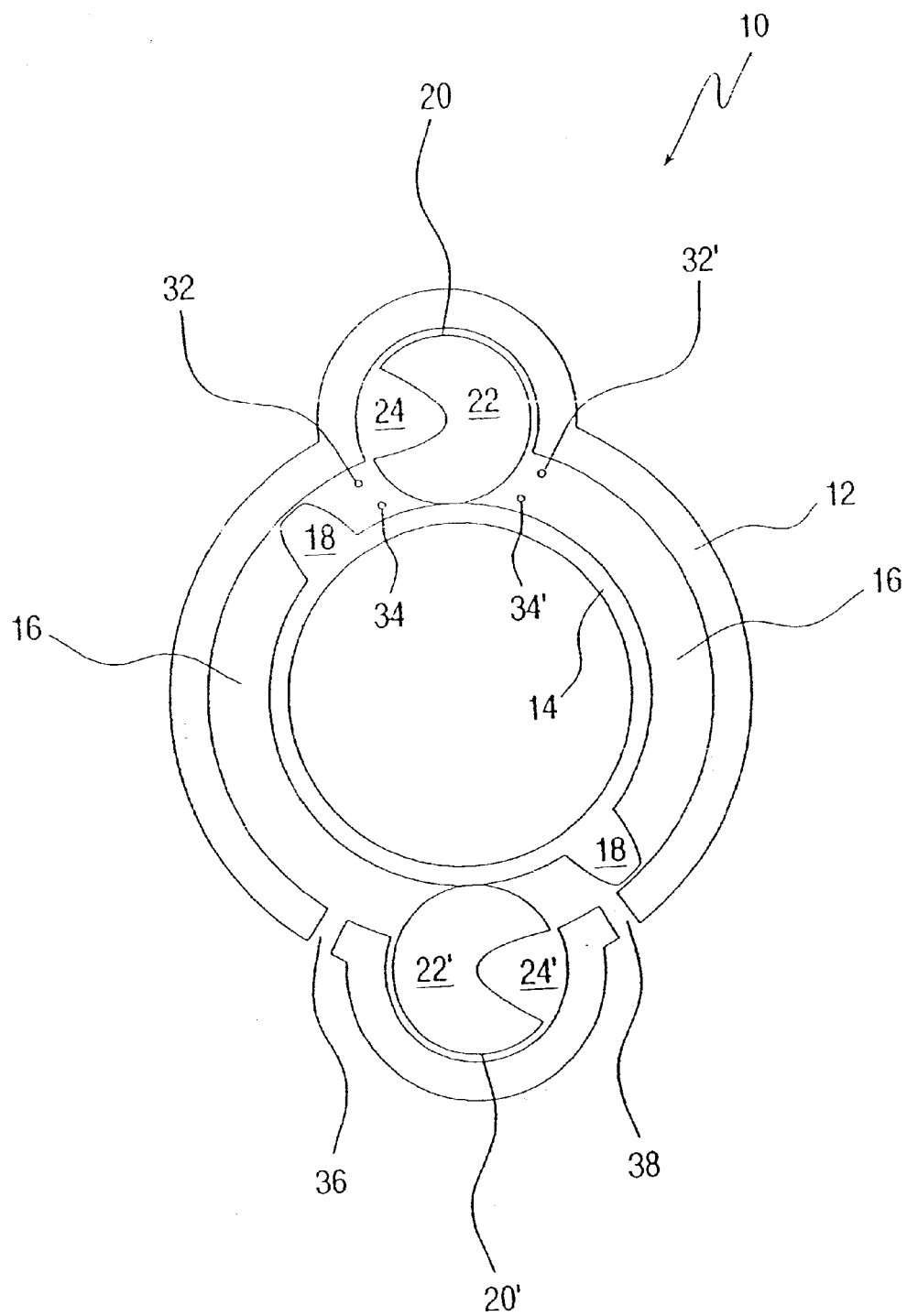
FIG. 1 is a transverse cross section of an engine of the present invention, which shows its main mechanical parts.

The principles of operation of toroidal internal combustion engine according to the present invention were detailed in PCT application US99/19315, and will be repeated here briefly for the sake of clarity:

Referring now to the drawings, FIG. 1 is a transverse cross section of a first embodiment 10 of an engine of the present invention. This is the basic configuration of the engine. Within a stationary housing 12 rotates an annular rotor 14. Rotor 14 is rigidly attached to a central drive shaft (not shown) that is coaxial with rotor 14 and with housing 12. Housing 12 and rotor 14 define between them a toroidal chamber 16. Two pistons 18 project from rotor 14 into chamber 16.

On opposite sides of housing 12 are two housing recesses 20 and 20' that accommodate two cylindrical-shaped valves 22 and 22' respectively, that rotate within housing recesses 20 and 20' in a direction opposite to the direction of rotation of rotor 14. Each valve 22 and 22' includes a valve recess 24,24' that accommodates pistons 18. The outer diameter of rotor 14 is twice the diameter of valves 22 and 22'. Valves 22 and 22' rotate twice for each rotation of rotor 14 so that the surfaces of valves 22 and 22' and of rotor 14 that are in mutual contact, do not slide relative to each other. The rotations of rotor 14 and valves 22 and 22' are synchronized by conventional mechanical linkages (not shown). Valve recesses 24 and 24' accommodate pistons 18 each time pistons 18 conclude a complete revolution. For this purpose, the matching surfaces of pistons 18 and of valve recess 24 are sections of the surfaces of right circular cylinders, as described by M. L. Novikov in *Tooth Gearings with New Engagement*, N. A. Zliukovsky, High Military Engineering Academy, Moscow, 1958 (in Russian).

Figure 2A:
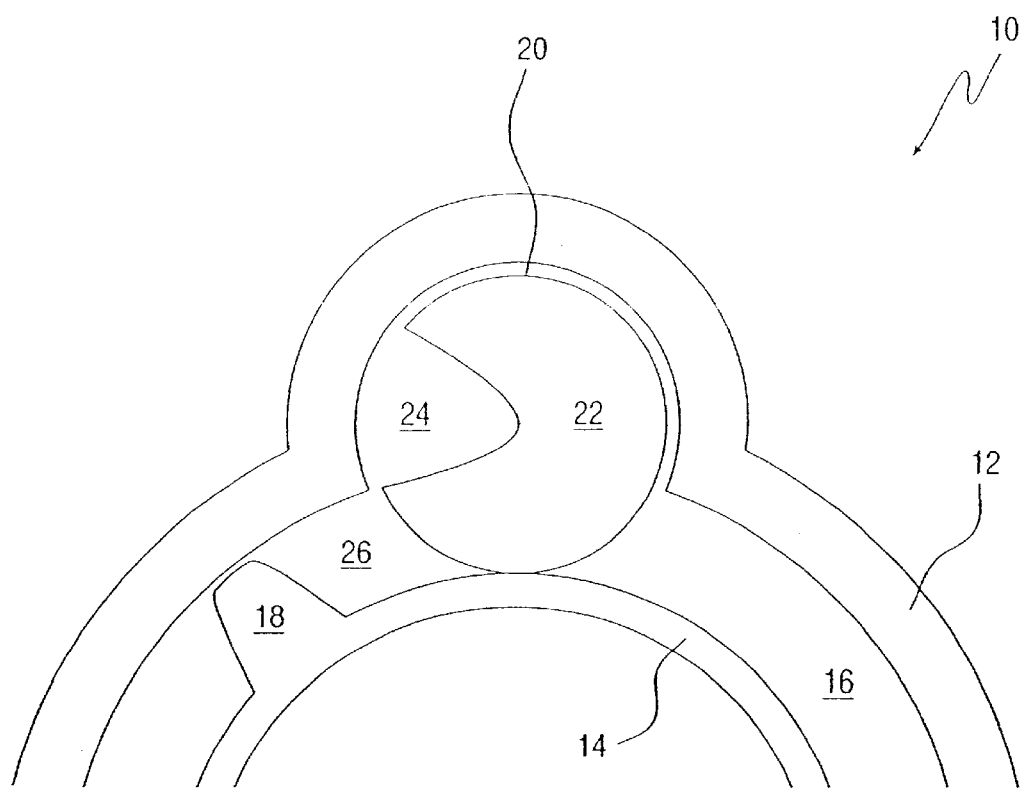
FIGS. 2A, 2B and 2C show a piston of the engine in FIG. 1 in three different positions relative to the valve of FIG. 1.
Figure 2B:
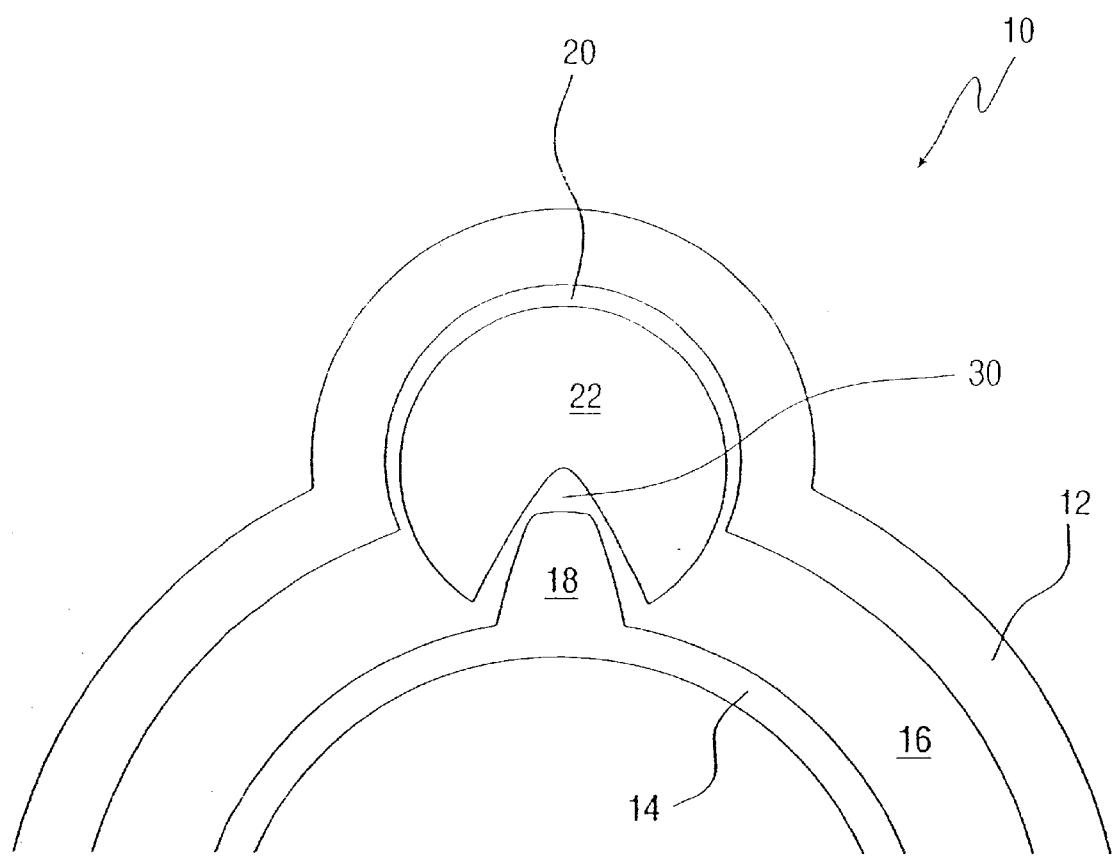
Figure 2C:
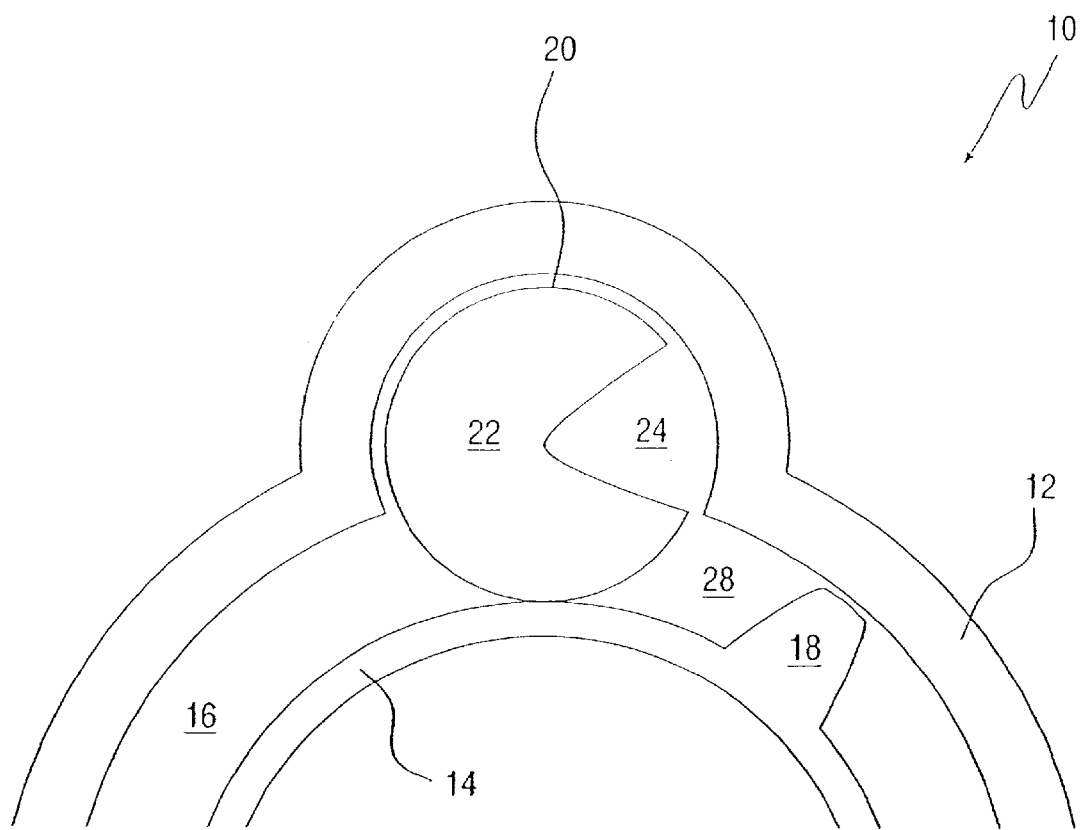

FIGS. 2A, 2B and 2C show a piston 18 in three different positions as rotor 14 rotates clockwise in housing 12 past counterclockwise-rotating valve 22. In FIG. 2A, as piston 18 approaches valve 22, piston 18 and valve 22 define a compression region 26 in chamber 16. In FIG. 2B, piston 18 is entirely within valve recess 24. The space within valve recess 24 that is not occupied by piston 18 is a combustion region 30 whose volume is approximately constant as piston 18 moves past valve 22. In FIG. 2C, as piston 18 departs from valve 22, piston 18 and valve 22 define an expansion region 28 in chamber 16.

The operation of engine 10, with rotor 14 rotating clockwise, is as follows. As piston 18 sweeps through the left side of chamber 16, piston 18 compresses air ahead of itself, in compression region 26, while drawing in more air behind itself into chamber 16 via an air inlet port 36. As piston 18 approaches valve 22, fuel is injected via a fuel injection port 32. Depending on the compression ratio in compression region 26, either the compressed fuel-air mixture ignites spontaneously when piston 18 is almost at valve 22, or an ignition source 34, such as a spark plug, ignites the compressed fuel-air mixture when piston 18 is almost at valve 22. As piston 18 passes valve 22, piston 18 and valve 22 define between them combustion region 30, where most of the combustion takes place at approximately constant volume. As piston 18 departs from valve 22, the hot, high-pressure gas created by the combustion process leaves combustion region 30 into expansion region 28 and pushes piston 18, thereby creating torque. More fuel is injected via a fuel injection port 32' and ignited by a spark plug 34' to continue the combustion and maintain the expanding gas at least initially at approximately constant pressure. As piston 18 sweeps through the right side of chamber 16, piston 18 pushes residual gases from the previous cycle out through exhaust port 38.

On startup, only fuel is injected via fuel injection port 32. During steady state operation, up to 15% steam is injected along with the fuel to allow operation at lower temperatures than would otherwise be possible, as described in prior art, e.g. in U.S. Pat. No. 5,797,366.

The above description in terms of housing 12 remaining stationary while rotor 14 rotates therewithin is illustrative rather than limitative. Rotor 14 can remain stationary while housing 12 rotates thereabout, in which case housing 12, rather than rotor 14, is rigidly attached to the drive shaft. Indeed, both housing 12 and rotor 14 can move, as long as rotor 14 rotates with respect to housing 12.

Operation of the rotary engine shown in FIG. 1 includes two combustion events per revolution of rotor 14, as compared to a single combustion event per cycle in the reciprocating internal combustion engines. Consequently, toroidal combustion engines operate at a higher temperature level than reciprocating internal combustion engines.

This higher temperature level requires means of efficient cooling, otherwise severe sealing and lubrication problem arise, the high temperature may even deform the construction of the engine body material. This is a well known problem, and indeed the only rotary internal combustion engine which is known to operate, the Wankel rotary engine, has an exceptional high ratio of surface area to working volume and is made of aluminum with excellent heat transfer qualities to facilitate the heat transfer to ambient.

Figure 3:
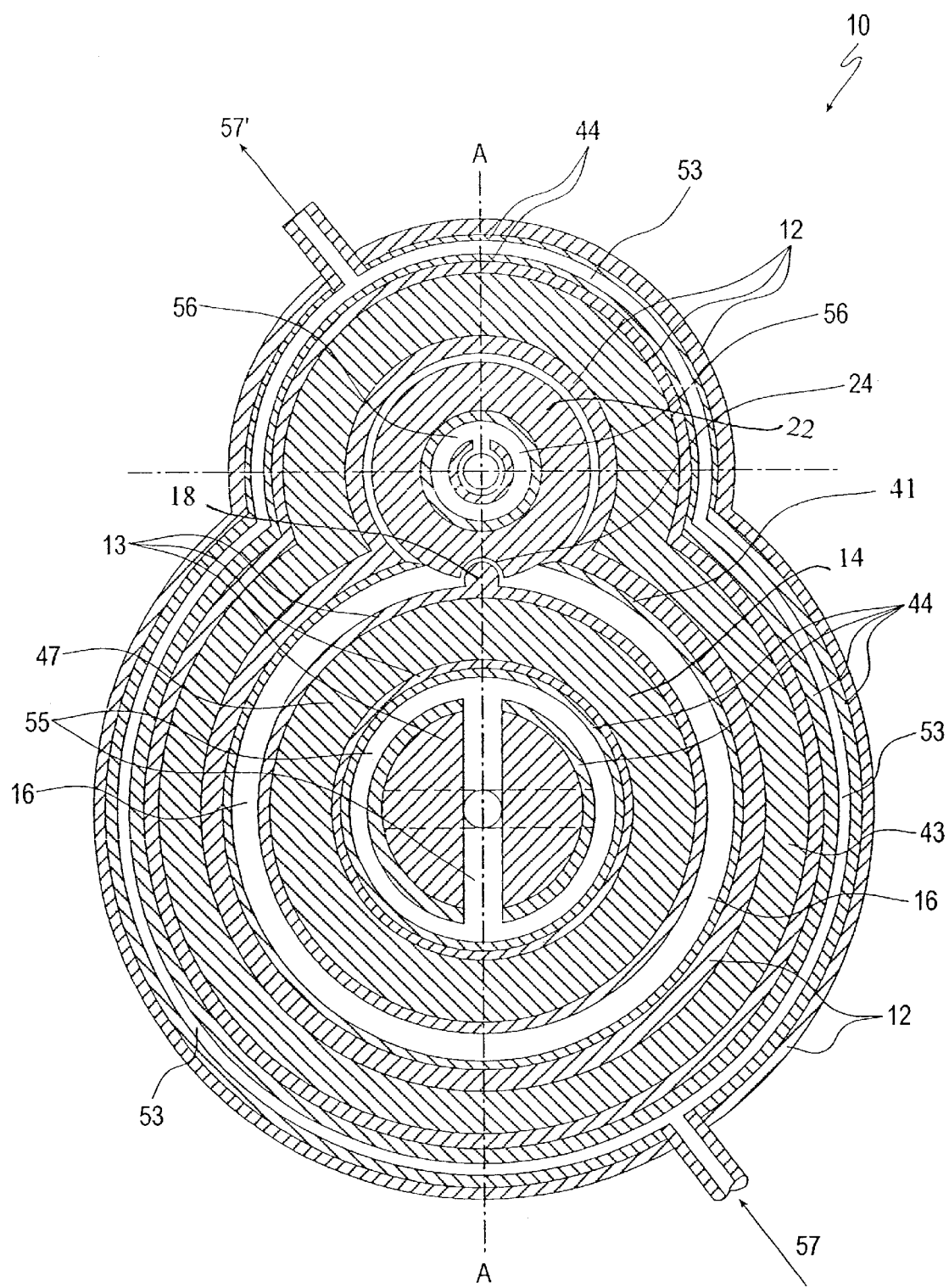
FIG. 3 is a transverse cross section of an engine according to the present invention, which shows its cooling channels and its material structure layout.
Figure 4:
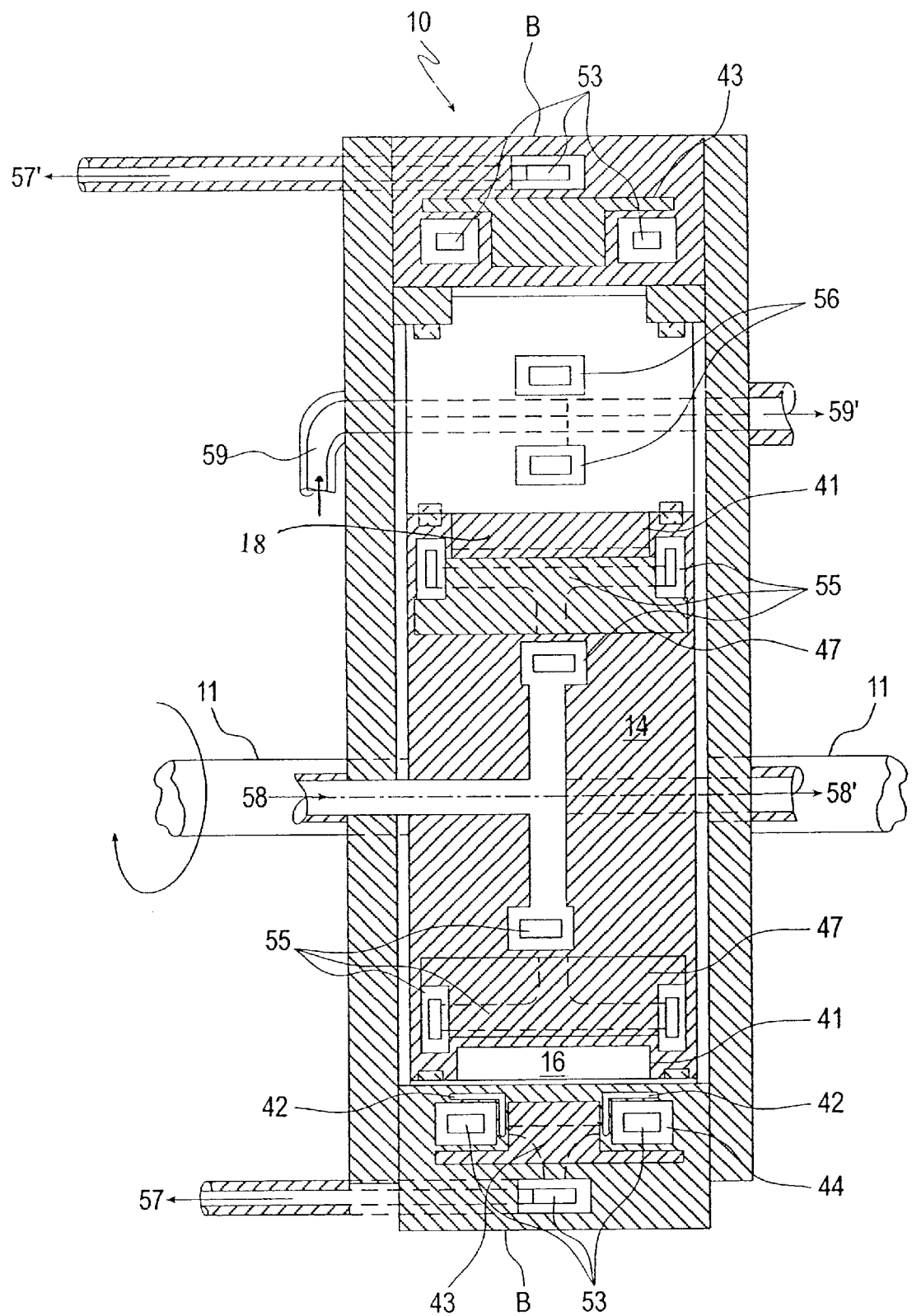
FIG. 4 is a longitudinal cross section of an engine of the present invention, which shows its cooling channels and its material structure layout.

The engine of the present invention, which is schematically illustrated in FIGS. 3 and 4, is cooled by transferring heat from the engine body to cooling liquid which run in cooling flow channels 53,55, and 56 which follow circumferentially the toroidal chamber 16 and are also attached to the inner walls of the rotor 14 and to valve 22 respectively. Also shown in FIGS. 3 and 4, are separate inlet ports 57, 58 and 59, and outlet ports 57', 58' and 59' of water and steam, to feed independently cooling flow channels 53,55 and 56 respectively. Ports 58 and 58' are coaxial with the drive shaft 11. Ports 59 and 59' are coaxial with the axis of rotation of valve 22. An external pump, at pressure of up to about 150 atmospheres, circulates the coolant.

According to this invention, each cooling flow channel functions as boiler in which boiling heat transfer takes place. In this mechanism, liquid transfers heat from its surrounding by absorbing heat which, provided the temperature is high enough, causes the partial evaporation of liquid This method is the most efficient method known for cooling and it is used to cool nuclear reactors. By using water in the channels, heat fluxes of the order of 30–100 W/cm$^2$ can be handled by the coolant, depending on the fluid velocity.

The temperature of the inner walls of the toroidal chamber 41, of the present invention is designed to reach 700° C., which is 400° C. to 500° C. higher than the inner wall temperature of the rotary Wankel engine. This is an innovative approach, which is aimed to optimize the combustion and to decrease the temperature difference between the hot gases and the walls in which they are confined, and by this to decrease the cooling rate of these gases.

Unless extra provisions to be detailed below are taken, such temperature of the inner walls of the chambers results in unacceptable heat losses to surrounding due to heat conduction of the conventional engine body. It may even be found that it is difficult to sustain such an inner surface temperature by using aluminum or one of its alloys as the housing material, thus a much worse heat conductor than aluminum with a higher melting point temperature has to be used for the housing material.

Hence, the constructing material for the housing 12, rotor 14 and valve 22, include metals selected from the group of iron alloys, as cast iron, or one of the various types of steel which withstand high pressure and high temperatures, having typical heat conductivity of the order of $2 \cdot 10^{-2}$ cal/(sec.cm.degree C.). The low thermal conductivity of the body material prevents severe heat loses to ambient, however, temperature gradients of up to 200 (degree C.)/cm., are expected to develop across the housing during engine operation, when 20–60 W per cm$^2$ of the wall of the combustion chamber, are removed by heat sinks (the cooling flow channels), which are close as possible to the heat sources (the combustion and expansion chambers). The heat, which is removed by boiling heat transfer, converts some of water in the cooling flow channels into steam, which is fed back into the combustion chamber, where it mixes with the compressed pre-burned mixture of fuel and air.

To enable the thermo-stabilization of the engine according to these principles, a unique thermal design which include the selection of the appropriate construction materials, has to be employed; this is detailed below:

The inner surface 41, of the toroidal chamber 16 in the combustion and expansion regions, which is in contact with burning gases, and whose temperature is designed to reach 700° C., is made from a thin layer of heat resistant, low friction, hard material with melting point higher than 1600° C.

Refractory metals such as titanium, molybdenum or tungsten are suitable, as well as their silicides or carbides. Various types of ceramics, which include silica, or alumina, or boronitride, can be also used.

The cooling flow channels 53, 55 and 56 provide the main heat sinks. The effective cooling by the mechanism of "boiling heat transfer" requires uniform and regulated distribution of heat fluxes into the channel along the circumference of the cooling surface, which is in contact with the water. The boiling heat transfer cannot handle heat fluxes which are too large (e.g. much greater then 120 W/cm $^2$), because then, vigorous boiling produces a layer of vapor between the wall and the cooling liquid which disrupts completely the process of heat transfer and leads to its cessation because of film boiling.

It is therefore necessary to regulate the heat fluxes across the cooling flow channel; these parts of the channel which are closer to the heat source, (the toroidal chamber in general and the combustion chamber in particular), have to be separated from the heat source by a heat barrier 42, preferably air, which moderates the heat flux into the channel from this direction.

The heat flux into parts which are farthest from the heat source has to be enhanced, this is achieved by "guiding" heat into the rear part of the channel using insertions 43, made of material with high thermal conductivity compared to that of iron or steel. We refer here to material with high thermal conductivity, to these which have thermal conductivity four times or more greater than that of iron, while material of low thermal conductivity are considered here to be these which have heat conductivity being equal or lower than that of iron.

In order to further increase the uniformity of the heat fluxes which are absorbed by the water, the interior part of the cooling flow channel is coated by a layer 44, of material with a thickness of less than 1 mm., with low heat conductivity compared to iron or steel, this material preferably is a ceramic.

The main body 13 of rotor 14, which consists in this embodiment of a solid cylinder, and piston 18, are made of hard iron or steel. Rotor 14 has a core 47 of a material with high thermal conductivity such as copper, aluminum or their alloys to enhance heat transfer toward cooling flow channels 55.

Figure 5:
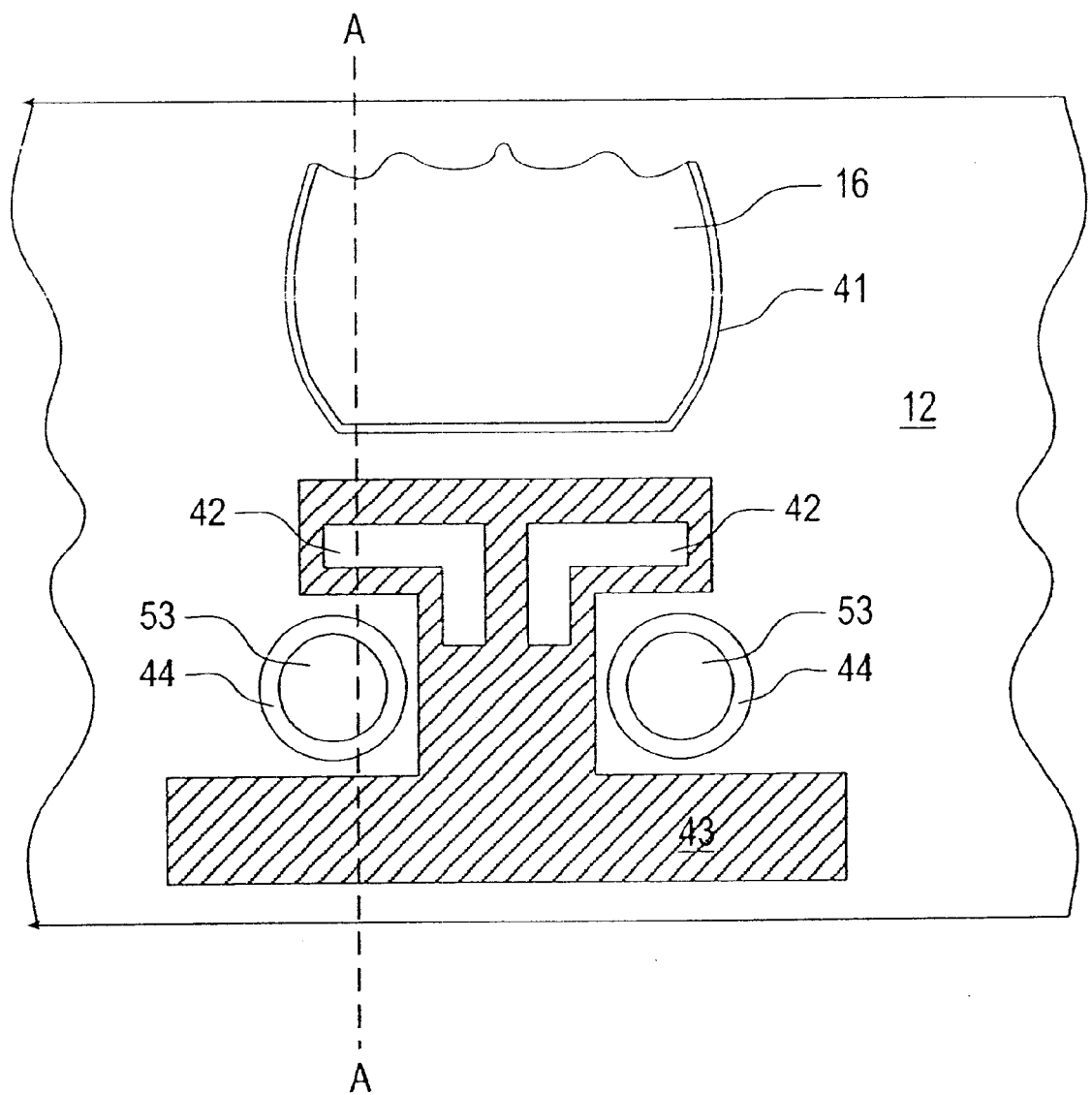
FIG. 5 is a partial longitudinal cross section of an engine of the present invention, which shows the region near the toroidal chamber in the housing.
Figure 6:
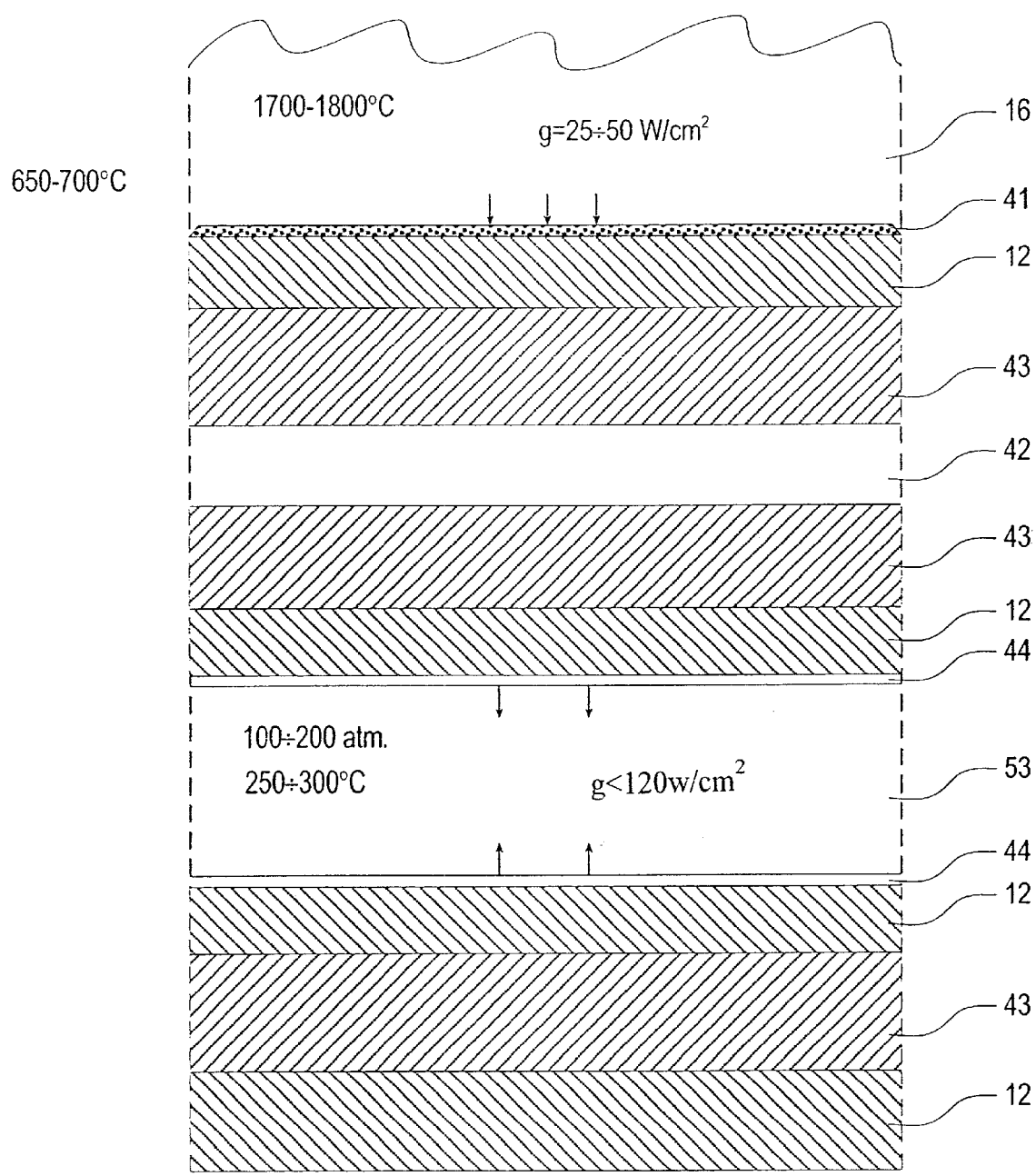
FIG. 6 is a cut along line A—A of FIG. 5, which shows the material structure layout near a cooling flow channel in the housing.

FIGS. 5 and 6 show a detailed cross section throughout the constructing material used according to a first embodiment of this invention. Part numbers in these figures, refer to the same parts as in FIGS. 3–4. The profiles are intended to be demonstrative rather then limitative and their object is to clarify the invention.

The engine of the present invention is operated in two regimes, the start-up and the thermo-stabilized state. Each regime has its own protocol for the introduction of air, fuel and steam to the combustion region 30. The main difference between the two protocols is that the start-up protocol does not use steam.

The benefit of introducing steam, which was produced by the boiling heat transfer of water, with regard to the lowering of the combustion temperature can be deduced from the following considerations:

Burning 1 Kg. of gasoline with 16.4 Kg. of air, produces about 10,000 Kcal. which heat the total mass of 17.4 Kg. of gases to about 2000° C.

During thermo-stabilization, about 25% of this energy is collected by the cooling system which generates 3.4 Kg. of steam at a pressure of about 100 atmospheres and 250° C. The steam is fed into the combustion chamber where it is mixed with the air and the gasoline vapor to increase the total mass of gases by about 15%. This mixture of gases has an average specific heat capacity of about 0.27 Kcal/(Kgdegree C.) and thus give rise to an initial burning temperature of about 1800° C.

It turns out that the effect of the increase in the mass of the working gases on the pressure in the expansion chamber, more then balances for the effect of the decrease in the temperature of the gases. Thus the power of the engine remains nearly as it would have been without steam injection, while the combustion temperature decreases by about 200° C. This lowers significantly the amount of nitrogen oxides, that are formed, and the amount of heat, that is released to surrounding.

Optionally, thermo-stabilization includes two more steps. First, the lines that deliver fuel are placed in thermal contact with the housing to pre-heat and to vaporize the fuel by conducting some of the heat from the housing into the fuel. Second, a certain amount of burned gases are transferred from the expansion chamber into the combustion chamber. This is detailed below.

The thermal design which is disclosed in the present invention and the method of thermal stabilization employed, are implemented in the following embodiment which merely serve as an example and does not limit the scope of the invention.

Figure 7:
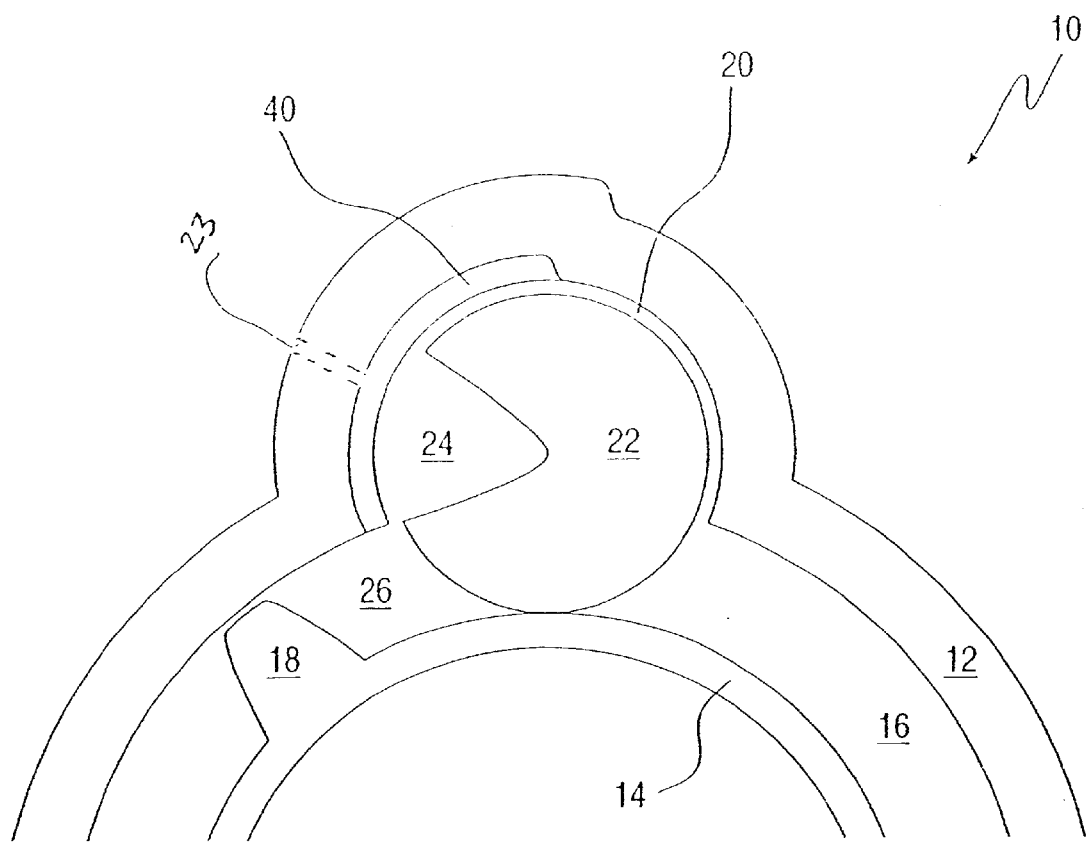
FIG. 7 is a partial transverse cross section of a variant of the engine of FIG. 1.
Figure 8:
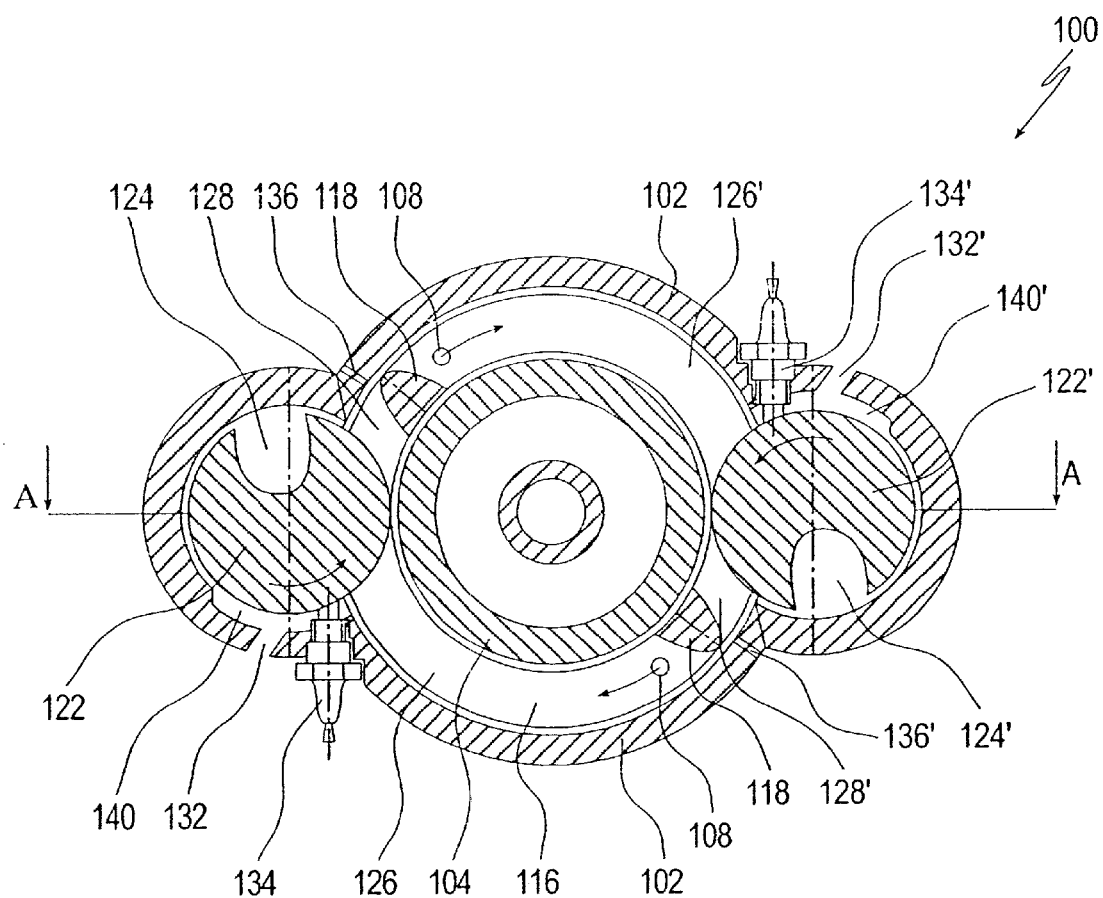
FIG. 8 is the transverse cross section of another variant of the engine of FIG. 1.

FIG. 7 is a partial transverse cross section of variant of engine 10 in which housing recess 20 includes a pre-chamber 40 that connects to compression region 26. The purpose of pre-chamber 40 is to equalize pressure between compression region 26 and valve recess 24, so that the pressure of compressed air fuel steam mixtures in compression region 26 does not drop suddenly when valve 22 reaches the point in the rotation of valve 22 at which valve recess 24 opens upon compression region 26.

Besides, per-chamber 40 is also used to accept an externally prepared mixture of fuel vapors, air and steam fed, if so desired, in addition to the engine's own working mixture. For this, an additional port 23, which leads the externally prepared mixture into the pre-chamber 40 of the recess of the valve 22, is provided in the housing.

FIGS. 8–12 show another embodiment 100 of the present invention.

Shaft 101, running along the axle of body 102 containing rotors 104 supplied with disks 106 mounted rigidly to shaft 101, in which openings 108 are made and between which a separating plate (diaphragm) 110 is loosely positioned, being rigidly fixed in body 102 and in which radial slots 112 are performed, whereas their diameters correspond to openings 108 of the rotors' disks, and openings 114 for the passage of rotors 104.

In this case end grains of timber in disks 106 of rotors 104 may slide on the surface of plate (diaphragm) 110.

In doing so two parallel circular chambers are created, the first of them 116a being a compression one, and the second 116b—an expansion one in the thermodynamic cycle of the engine.

In this realization each compression toroid chamber 116 contains two pistons 118, which are ridges of rotor 104, and two revolving valves 122a and 122a', having recesses 124a and 124a' respectively. Toroid chambers 116a and 116a' are divided to two compression areas 126a and 126a' and two suction areas 128a and 128a'. Pre-chambers 140a and 140a' connect compression areas 126a and 126a' to combustion volumes in recesses 124a and 124a' of the valves. Fuel is injected through openings 132a and 132a', and air is fed through channels 136a and 136a'.

The compressed mixture ignites from sparking plugs 134 and 134' and through openings 108 in disks 106 of rotor 104 and slot 112 of separating plate 110 enters expansion chambers 116b and 116b'. Expansion chambers 116b and 116b' contain two pistons 118b, which are ridges of rotor 104b and two revolving valves 122b and 122b', having recesses 124b and 124b' respectively.

Toroid chambers 116b and 116b' are divided to two expansion areas 128b and 128b' and two ousting areas 126b and 126b'. The inner cavity of body 102 is separated by disks 106 of rotors 104, each of them bearing passage openings 108, and by plate (diaphragm) 110 having radial slots 112 into two adjacent circular chambers, each of which is separated by sealers (valves) 122 and pistons 118 to volumes of suction 128a, compression 126a, expansion 128b and ousting 126b.

In addition, in the engine's body 102 throttles 123 are made and located in connective channels 125 in the wall of body 127 between valves (sealers) 122.

Figure 9:
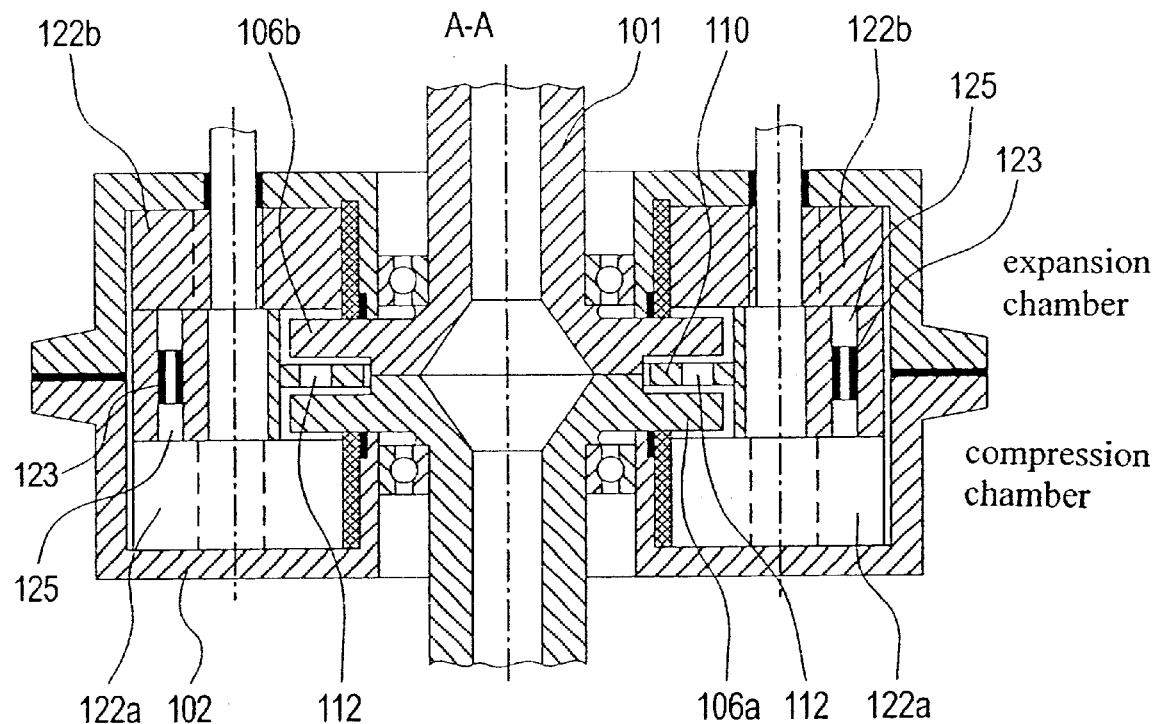
FIG. 9 is a longitudinal cross section of the engine of FIG. 8.
Figure 10:
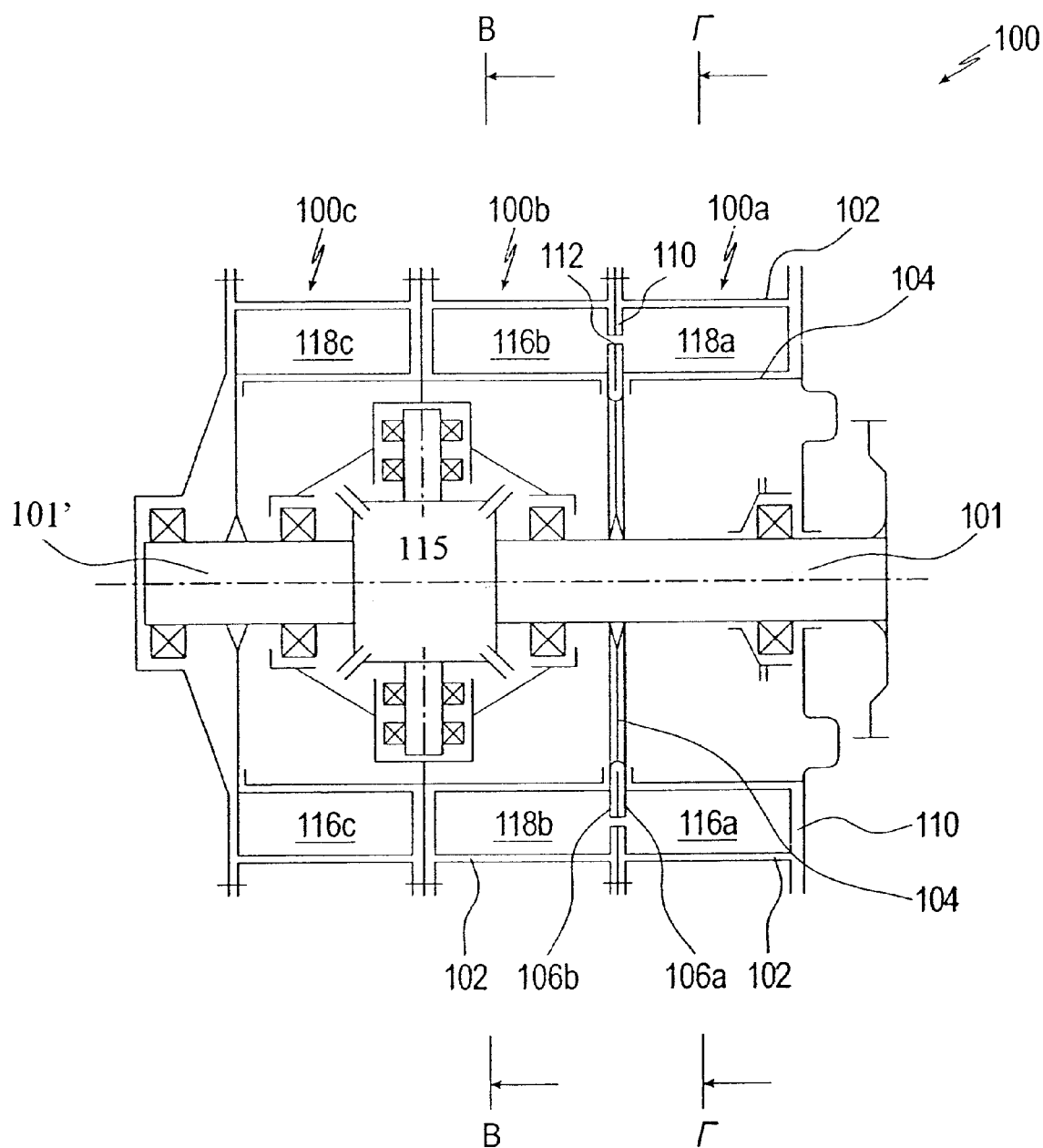
FIG. 10 shows a schematic transverse layout of the engine of FIG. 9.

As indicated in FIGS. 9 and 10, the engine includes partition (diaphragm) 110, shown in pictures 11a and 11b. The diaphragm is multi-layered and has an external surface, made of a low-friction material, i.e. having a carbon-like layer.

In order to resist high temperatures, occurring when the engine operates, the inner part of the diaphragm is made of heat-resistant steel, for example, chrome-nickel steel.

Diaphragm 110 has openings 114 for rotors, two plugs 120 for matching the axles of revolving valves 122 and two radial slots 112, which are made opposite the projections of openings 108 in disks 106 of the rotors.

Figure 11A:
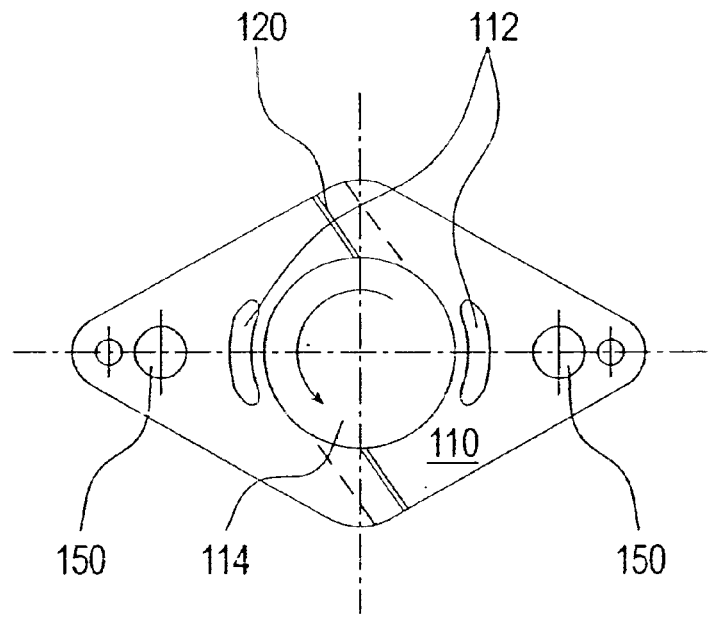
FIGS. 11A, 11B show a metallic diaphragm used in the construction of the engine shown in FIGS. 9 and 10.
Figure 11B:
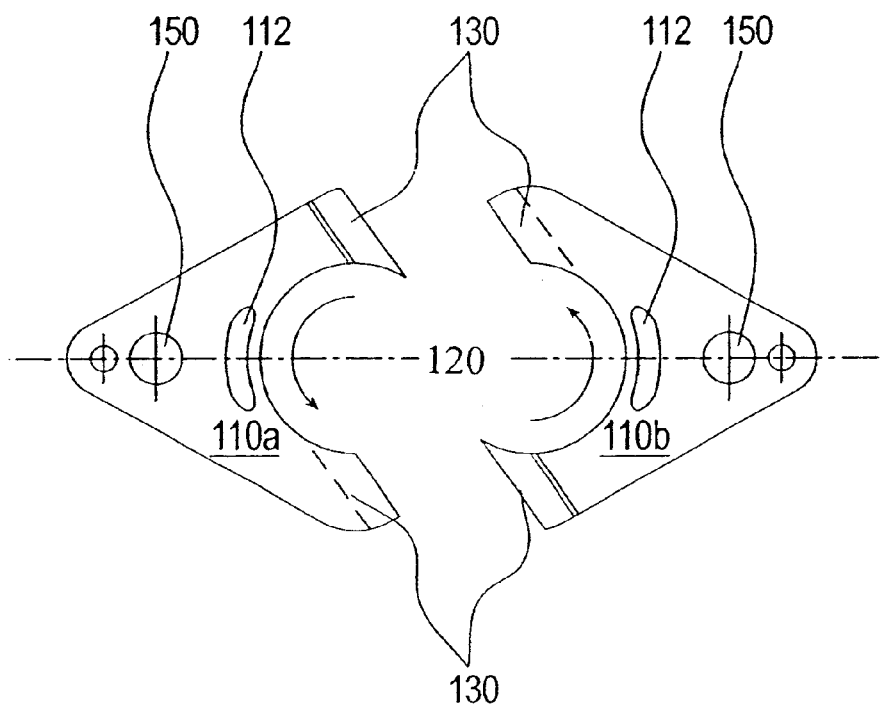

Diaphragm 110 is composite and contains two nodes 110a and 110b, as indicated in FIG. 11b. Each node contains two narrowing fins 130, which are joined together by fixing the narrowing fins belonging to node 120 and embracing narrowing fins 130 of node 120 so that they form an invariably flat surface, which can not be distorted by disks 106 of rotors 104 during their rotation and mutual sliding of their surfaces past each other.

A detailed description of the engine operation indicated in FIGS. 8–12 is presented in application PCT US 99/19315, therefore it is repeated here only briefly. These engines have a double number of working chambers that is why for each rotation of rotor 104 there are two rotations of valves 122.

As noted above, the first rotor 104a along with body 102 form toroid chamber 116a, whereas the second rotor 104b along with body 102 form toroid chamber 116b.

The third device indicated in FIG. 10 contains also expansion chamber 100c, mounted to the block of devices 100a and 100b, and rotates shaft 101', whose speed and rotation direction are determined by reducer 115.

The engine operates in the following way.

When pistons 118a are moving in toroid chamber 116a toward valves 122a, they compress the mixture of fuel, air and steam in area 126 in front of the front surface of piston 118a, which was inserted through opening 136 in the previous cycle.

Next to valve 122a, though before a contact between piston 118a and valve 122a, sparking plugs 134 (indicated in FIG. 8) in toroid chamber 116a ignite the air-fuel working mixture (AFWM) in area 126a, which changes in time $V_a$.

At that moment openings 108a and openings 108b in disks 106a and disks 106b of rotors 104a and 104b respectively are set opposite slots 112 on plate (diaphragm) 110. In doing so the combustible gases, which have been ignited in compression zones 126a and 126a' of toroid chamber 116a, pass inward toroid chamber 116b, namely, into expansion zones 128b and 128b', while the gases of the previous cycle of the engine are forced out of zones 126b and 126b'. In this manner ignition and burning of the working mixture occurs in a volume initially formed in compression zone 126, and afterwards in expansion zone 128, and continues even after pistons 118a mate with valves 122a, while pistons 118b that are moving ahead have already disengaged from valves 122b in toroid chamber 116b. As this takes place, expansion area 128b performs the working stroke of the engine, transforming the energy of compressed gases into work, during which the volume of this area constantly changes $V_b$.

Hence burning of AFWM takes place at the beginning in a practically invariable volume $V_a+V_b$, which increases the efficiency of the engine operation.

Figure 12:
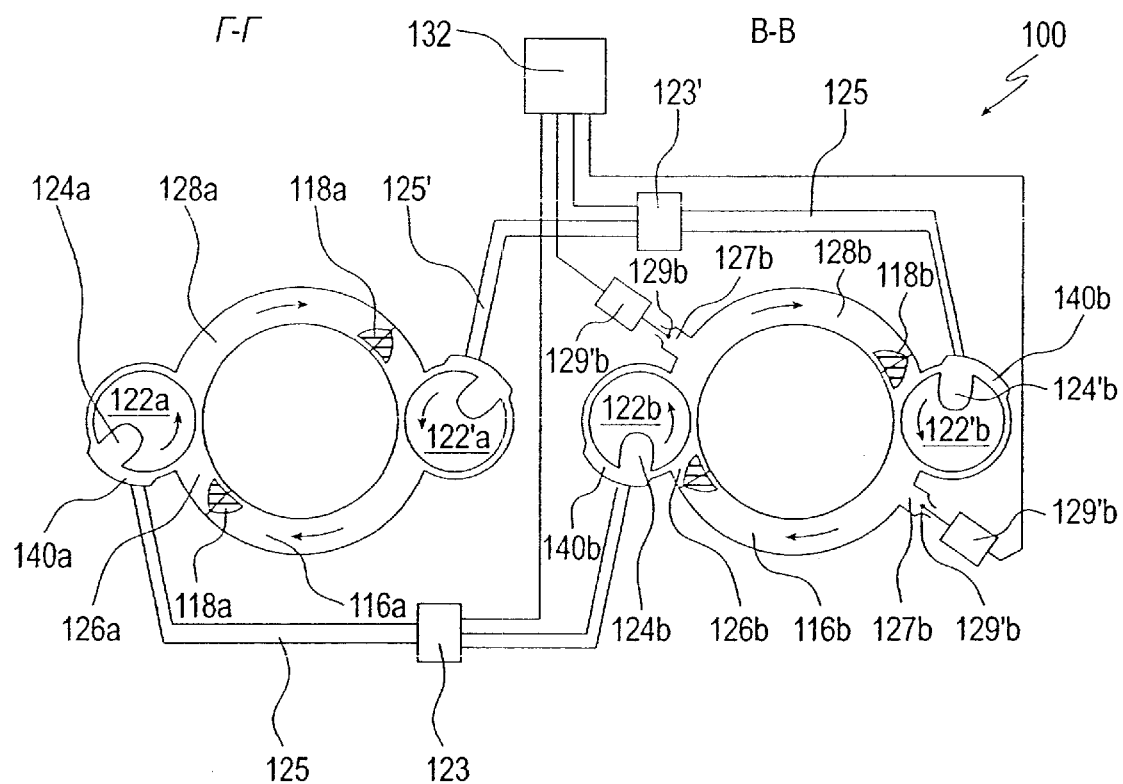
FIG. 12 shows the operation of the engine shown in FIGS. 9 and 10.

When the engine's operation is stable, its efficiency can be improved by using the heat of hot gases in recesses 124b (FIG. 12). The compression of the air and of AFWM (air-fuel working mixture) situated in recesses 124a of sealers 122a is carried out by relieving the gas compressed and combusted in the previous cycle from recess 124b of adjacent sealer 122b. For this purpose relief channel 125 periodically connects recesses 124a and 124b through corresponding inner cavities 140a and 140b in body 102. Throttle 123 modifies (dozes) the amount of the gas relieved by channel 125 according to the engine mode on command of controller 132.

As a result of relief, the pressure of AFWM and the relieved gas in recesses 122a grows, and the pressure of the burnt gas in recesses 122b drops.

After the compression a process of AFWM relief from the compression chamber to the expansion one through the relief channel formed by openings 108 in rotor's disks 106 and slot 112 in diaphragm 110. In this manner a relief channel with a system of openings 108 and slot 112 of a plate is formed periodically in the rotor's disks and the body's plate positioned between them.

The process of the air relief can be complemented by feeding fuel, for example, by means of a corresponding system performed by a familiar method (not shown).

The compression pressure of AFWM situated in compression chambers 126 can exceed the compression pressure of AFWM and combustible gases in recesses 124, which leads to AFWM blending, occurring with depressurization of recesses 124 in chambers 126 during the rotation of sealers 122 and rotor 104, to its intense turbulence in the location area of igniters 134 and improves the efficiency of AFWM ignition.

In case of using fuel with a low self-ignition temperature, AFWM may be ignited by a relief of hot gases through throttle 123. Then the pressure of AFWM and of the relieved hot gases in recesses 124 in depressurization should be significantly higher than the pressure of AFWM compressed in chambers 126.

The process of combustion and relief ends with rotor 104 positioned correspondingly to bringing recesses 124 into coincidence with pistons 118 of the compression chamber. The process of combustion and relief corresponds to the period of the combustion chamber formation and takes place at constant volume, since the combined volume of the combustion chamber's parts is mostly constant.

Figure 13:
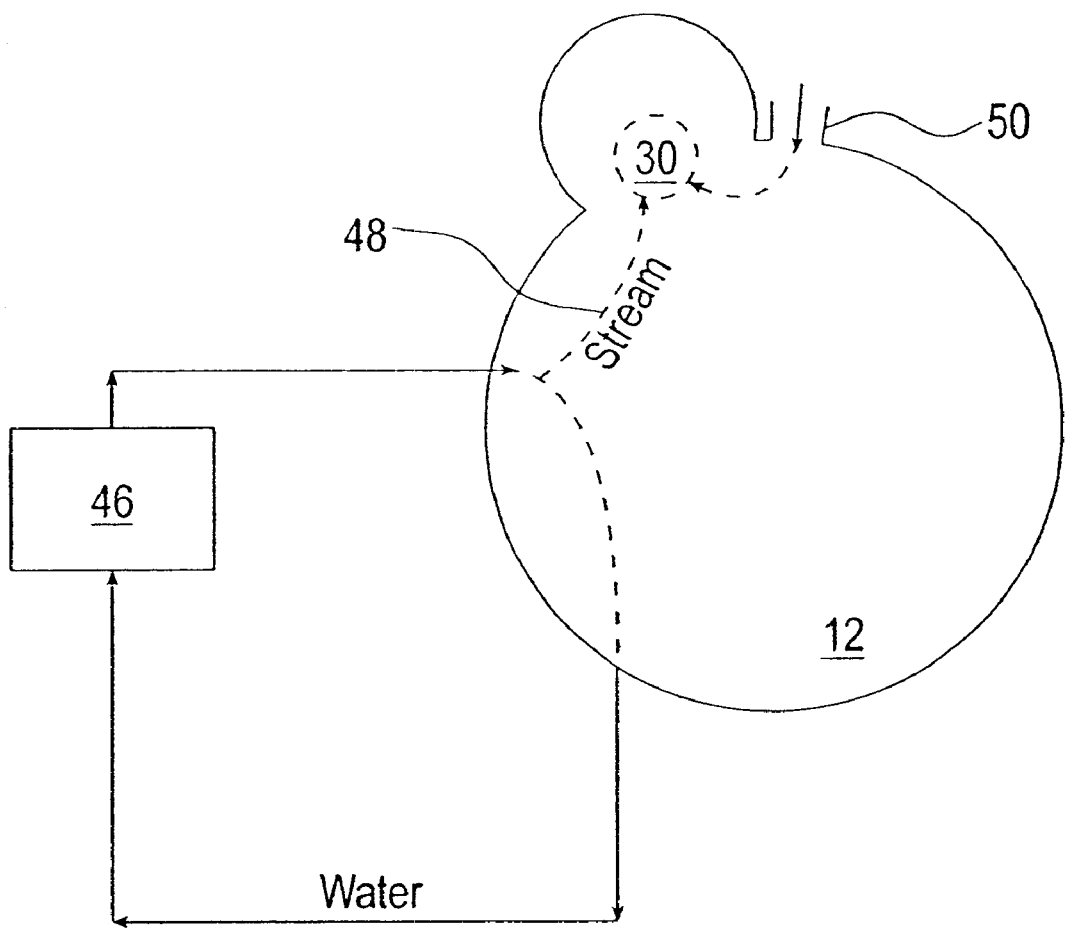
FIG. 13 is a schematic block diagram of the engine with thermostabilization and steam feedback systems.

FIG. 13 presents a scheme of the engine cooling and steam feeding systems. The circulation of the refrigeration agent in body 12 of the engine is performed by means of a high-pressure pump 46. Part of the steam carried away by the overheated circulating water is picked and introduced to the corresponding compression chamber 30, where through inner connection 48 the steam is blended with the fuel.

Although the invention is described here in respect to a limited number of realizations, it is clear that there exist numerous opportunities for change, modification and application of the present invention.

What is claimed is:

1. A rotary internal combustion engine, comprising:
    (a) a housing;
    (b) a rotor, rotating within said housing;
    (c) a mechanism for supplying fuel and air to said housing, combustion of said fuel and said air then driving said rotation of said rotor;
    (d) at least one cooling flow channel to carry an aqueous cooling medium in at least one component selected from the group consisting of said housing, and said rotor; and
    (e) a thermal stabilization system for moderating heat fluxes into said cooling medium, to ensure that said heat fluxes will be no greater than 120 W/cm$^2$, said thermal stabilization system including at least three different materials of differing heat conductivities, said materials being deployed within said housing so as to guide heat transference and increase uniformity of heat fluxes.

2. The engine as in claim 1, wherein said housing, said rotor and said housing define between them a toroidal chamber, said rotor including at least one piston projecting into said toroidal chamber, the engine further comprising:
    (f) at least one valve, movably mounted within said housing, said housing, said piston and said valve defining between them a combustion region with substantially constant volume as said piston moves past said valve.

3. The engine as in claim 1, wherein said thermal stabilization system further includes; a lining of an inner wall of said at least one cooling flow channel, said lining consisting of a material with a heat conductivity of at most of $15 \cdot 10^{-3}$ cal/(cm.sec.deg C.).

4. The engine as in claim 1, wherein said thermal stabilization system further includes a heat transfer wall separating combustion and expansion chambers from said cooling medium, said heat transfer wall having a plurality of layers with differing heat conductivities sandwiched together in thermal contact.

5. The engine as in claim 4, in which said layers of said heat transfer wall include layers made of material of low heat conductivity, having embedded insertions of material of high heat conductivity, said insertions at least partially enveloping said at least one flow channel.

6. The engine as in claim 5, in which said material of low heat conductivity is an iron alloy, and said material of high heat conductivity, is a metal selected from a group consisting of copper, aluminum, and alloys, thereof.

7. The engine as in claim 5, in which said insertions of material of high heat conductivity include a thermally insulating heat barrier.

8. The engine as in claim 7, in which said thermally insulating heat barrier is air.

9. The engine as in claim 1, wherein said rotor includes a core made of a material selected from the group consisting of copper, aluminum, and alloys, thereof.

10. The engine as in claim 1, wherein at least one of said at least one cooling flow channel passes through an inner part of said rotor.

11. The engine as in claim 2, wherein at least one of said at least one cooing flow channel passes through an inner part of said at least one valve.

12. The engine of claim 1, wherein at least one cooling flow channel further includes at least one high pressure pump to circulate to said cooling medium in said at least one flow channel at a pressure up to 200 Kg/cm$^2$.

13. The engine as in claim 2, further comprising;
(g) a feedback system for feeding steam produced by boiling of said cooling medium in said at least one cooling flow channel, into said combustion chamber.

14. The engine as in claim 13, wherein said feedback system includes;
(i) at least one port to extract said steam from said cooling flow channel; and,
(ii) at least one port for injecting said dry compressed steam into at least one of said at least one combustion chamber.

15. A rotary internal combustion engine, comprising:
(a) a housing;
(b) a rotor, rotating within said housing;
(c) a mechanism for supplying fuel and air to said housing, combustion of said fuel and said air then driving said rotation of said rotor;
(d) at least one cooling flow channel to carry an aqueous cooling medium in at least one component selected from the group consisting of said housing, and said rotor; and
(e) a thermal stabilization system for moderating heat fluxes into said cooling medium, to ensure that said heat fluxes will be no greater than 120 W/cm$^2$, said thermal stabilization system including a heat transfer wall separating combustion and expansion chambers from said cooling medium, said heat transfer wall having a plurality of layers with differing heat conductivities sandwiched together in thermal contact.

16. The engine as in claim 15, in which said layers of said heat transfer wall include layers made of materials of low heat conductivity, having embedded insertions of material on high heat conductivity, said insertions at least partially enveloping said at least one flow channel.

17. The engine as in claim 16, in which said material of low heat conductivity is an iron alloy, and said material of high heat conductivity is a metal selected from a group consisting of copper, aluminum, and alloys thereof.

18. The engine as in claim 17, in which said insertions of material of high heat conductivity include a thermally insulating heat barrier.

19. The engine as in claim 18, in which said thermally insulating heat barrier is air.

* * * * *